(12) United States Patent
Chang et al.

(10) Patent No.: US 9,784,576 B2
(45) Date of Patent: Oct. 10, 2017

(54) CALIBRATION METHOD FOR MERGING OBJECT COORDINATES AND CALIBRATION BOARD DEVICE USING THE SAME

(71) Applicant: AUTOMOTIVE RESEARCH & TEST CENTER, Chuanghua County (TW)

(72) Inventors: Kuo-Ching Chang, Changhua County (TW); Hsuan-Yu Huang, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 17 days.

(21) Appl. No.: 14/980,108

(22) Filed: Dec. 28, 2015

(65) Prior Publication Data

US 2017/0188022 A1    Jun. 29, 2017

(51) Int. Cl.
*G06K 9/00*      (2006.01)
*G01C 3/08*      (2006.01)
*H04N 1/00*      (2006.01)
*G06T 7/00*      (2017.01)

(52) U.S. Cl.
CPC .............. *G01C 3/08* (2013.01); *G06T 7/0018* (2013.01); *G06T 7/0042* (2013.01);
(Continued)

(58) Field of Classification Search
CPC .......... H04N 1/00039; H04N 1/00045; H04N 1/00087; H04N 1/00819; H04N 13/0203; H04N 13/0022; H04N 13/0246; H04N 13/0271; H04N 17/00; H04N 17/002; H04N 17/004; H04N 2201/0005; H04N 2013/0081; G01C 3/00; G01C 3/10; G01C 3/16–3/26; G01C 5/00; G01C 5/02; G01C 17/38; G01C 21/00; G01C 21/005; G06T 7/70; G06T 7/80; G06T 7/85; G06T 7/97;
(Continued)

(56) References Cited

U.S. PATENT DOCUMENTS 6,876,761 B1* 4/2005 Okuda .................... G06T 7/80
                                                    228/105
6,915,072 B2* 7/2005 Takahashi .............. G03B 13/04
                                                    348/188
(Continued)

*Primary Examiner* — Jose Couso
(74) *Attorney, Agent, or Firm* — Rosenberg, Klein & Lee

(57) ABSTRACT

A calibration method for merging object coordinates and a calibration board device using the same are provided. The calibration board device has a plurality of characteristic points and a central reflection element. A center of the central reflection element has a central characteristic point. A distance sensor emits a distance sensing signal to the central reflection element, so as to obtain a central real coordinate. Intrinsic and extrinsic parameters of a camera is used to establish a transformation equation which transforms the central real coordinate into a central image coordinate. Finally, a calibration image of the calibration board device is retrieved, and the central characteristic point is searched, and the central image coordinate is projected on the calibration image whereby the central image coordinate is calibrated to aim at the central characteristic point on the calibration image, thereby generating extrinsic and intrinsic parameter parameters calibrated.

13 Claims, 5 Drawing Sheets

(52) U.S. Cl.
CPC ..... *H04N 1/00039* (2013.01); *H04N 1/00045* (2013.01); *H04N 1/00087* (2013.01); *G06T 2207/10004* (2013.01); *G06T 2207/10024* (2013.01); *G06T 2207/30204* (2013.01); *H04N 2201/0084* (2013.01)

(58) Field of Classification Search
CPC ......... G06T 19/006; G06T 3/00; G06T 15/20; G06T 2207/30204; G06T 2207/30244; G06T 2207/10021; G06T 2207/10028; G06T 2207/30108; G06T 2207/30141; G06T 2207/30208; G06T 2207/30252; G06K 15/027; G06K 9/46; G06K 9/6215; G01B 21/042; G01B 11/03; G01B 11/2504; G06F 3/0304; G06F 3/0346; B60R 2300/402; G01N 2203/647
See application file for complete search history.

(56) References Cited

U.S. PATENT DOCUMENTS

| | | | | |
|---|---|---|---|---|
| 7,783,443 B2* | 8/2010 | Aratani | ................. | G06T 7/70 382/141 |
| 7,894,661 B2* | 2/2011 | Kosaka | ................. | G06T 7/80 348/42 |
| 8,310,539 B2* | 11/2012 | Zhao | ................. | B23Q 17/2233 348/142 |
| 9,386,302 B2* | 7/2016 | Zeng | ................. | G06T 7/80 |
| 9,612,332 B2* | 4/2017 | Wicks | ................. | G01B 11/2504 |
| 9,648,300 B2* | 5/2017 | He | ................. | H04N 13/0246 |
| 9,667,955 B2* | 5/2017 | Falk | ................. | G01B 11/02 |
| 2012/0287232 A1* | 11/2012 | Natroshvili | ................. | G06T 7/33 348/36 |
| 2012/0287247 A1* | 11/2012 | Stenger | ................. | H04N 13/0253 348/47 |
| 2014/0340508 A1* | 11/2014 | Yamamoto | ................. | B23Q 17/2233 348/94 |
| 2015/0053855 A1* | 2/2015 | Shirai | ................. | G01B 15/00 250/307 |
| 2015/0369593 A1* | 12/2015 | Myllykoski | ................. | G06T 7/73 348/136 |
| 2016/0005164 A1* | 1/2016 | Roumeliotis | ................. | G01C 21/165 348/116 |
| 2016/0134860 A1* | 5/2016 | Jovanovic | ................. | G01B 21/042 348/50 |
| 2017/0045436 A1* | 2/2017 | Fox | ................. | G01N 15/1012 |

\* cited by examiner

CALIBRATION METHOD FOR MERGING OBJECT COORDINATES AND CALIBRATION BOARD DEVICE USING THE SAME

BACKGROUND OF THE INVENTION

Field of the Invention

The present invention relates to a method for merging coordinates, particularly to a calibration method for merging object coordinates sensed by different sensors and a calibration board device using the same.

Description of the Related Art

Improving driving safety is an important part of developing traffic transportation industry. As a result, it is important to use a comprehensive algorithm for detecting obstructions including pedestrians, bicycles, motorcycles and cars around an automobile.

Presently, the matures-growing systems are an image-retrieving system and a distance-retrieving system among various automobile sensing systems. They merge the information sensed by different sensors to achieve complementary and good detection purposes, and apply to an obstruction detection system effectively. However, the image retrieved by a camera determines positions and depths of obstructions according to intrinsic and extrinsic parameters of the camera. With human intervention and the relevant parameters setting, the intrinsic and extrinsic parameters are figured out by using the camera. For example, in the existing technology, the camera captures calibration images of a calibration device, and then the characteristic points on the calibration images are manually retrieved to estimate the intrinsic parameters of the camera. It stands to reason that the extrinsic parameters of the camera are figured out with human intervention and the relevant parameters setting. The process not only costs a lot of time but also lacks convenience.

To overcome the abovementioned problems, the present invention provides a calibration method for merging object coordinates and a calibration board device using the same, so as to solve the afore-mentioned problems of the prior art.

SUMMARY OF THE INVENTION

A primary objective of the present invention is to provide a calibration method for merging object coordinates and a calibration board device using the same, which transforms and merges coordinates of different systems, and which displays the coordinates of obstructions sensed by a distance sensor on an image, and which precisely estimates the positions of the obstructions on the image.

Another objective of the present invention is to provide a calibration method for merging object coordinates and a calibration board device using the same, which directly establishes several characteristic points on an aimed device lest the characteristic points be manually set on the image subsequently, thereby increasing the speed of calculation process.

To achieve the abovementioned objectives, the present invention provides a calibration method for merging object coordinates. Firstly, a calibration board device with a center thereof having at least one central reflection element is provided, wherein a center of the central reflection element has a central characteristic point. Then, at least one distance sensor emits at least one distance sensing signal to the central reflection element to obtain a central real coordinate of the central reflection element. Then, an extrinsic parameter and an intrinsic parameter of a camera are used to establish a transformation equation and the central real coordinates are transformed into a central image coordinate according to the transformation equation. Then, the camera is used to retrieve at least one calibration image of the calibration board device, and the central characteristic point is searched on the calibration image, and the central image coordinate is projected on the calibration image. Finally, an estimation algorithm is used to calibrate errors whereby the central image coordinate is calibrated to aim at the central characteristic point on the calibration image, thereby generating calibrated extrinsic parameter and calibrated intrinsic parameter.

Besides, the present invention also provides a calibration board device using a calibration method for merging object coordinates. The calibration board device comprises a board having an aimed pattern, and the aimed pattern has a plurality of characteristic points, and a camera is provided to retrieve a plurality of calibration images to calculate an intrinsic parameter and an extrinsic parameter of the camera. A central reflection element arranged on a center of the aimed pattern and having a reflection concave surface, and a center of the central reflection element has a central characteristic point.

Below, the embodiments are described in detail in cooperation with the drawings to make easily understood the technical contents, characteristics and accomplishments of the present invention.

DETAILED DESCRIPTION OF THE INVENTION

Figure 1:
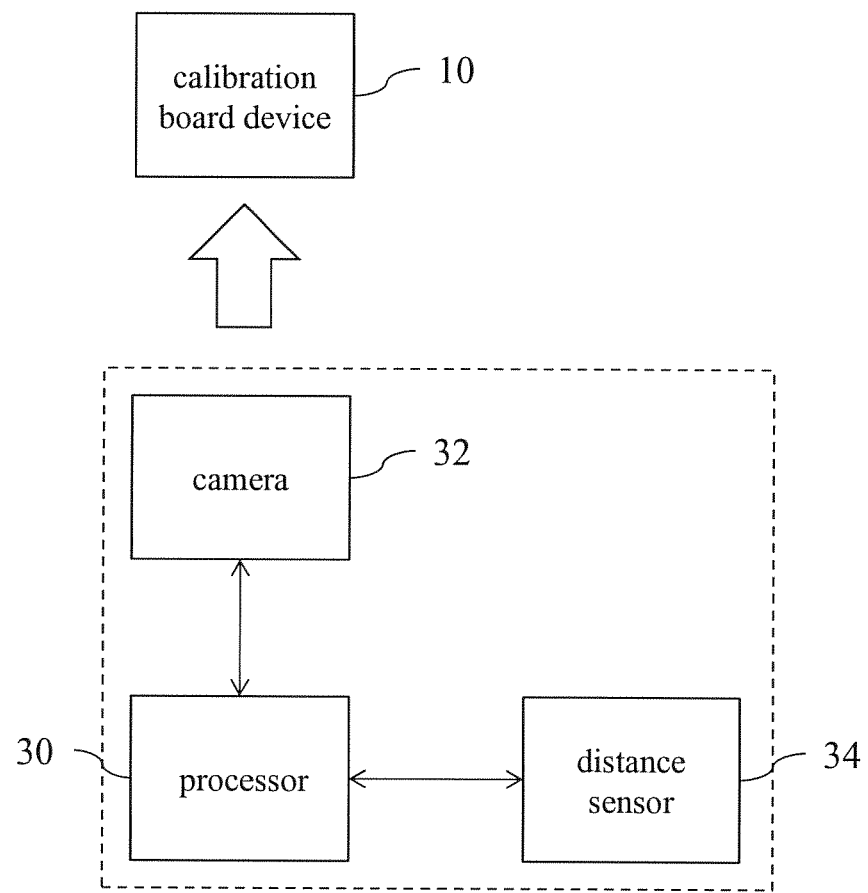
FIG. 1 is a block diagram schematically showing a system according to an embodiment of the present invention.
Figure 2A:
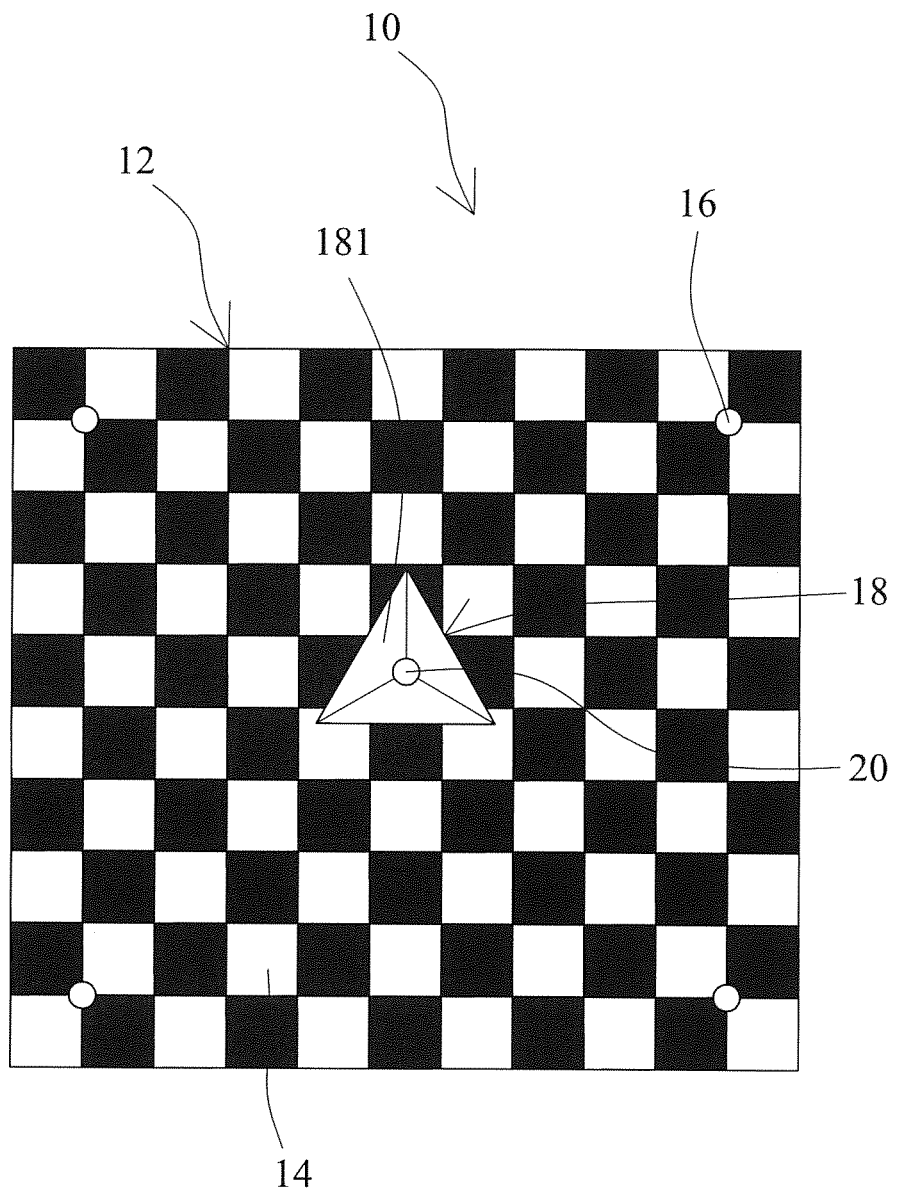
FIG. 2A is a front view showing a calibration board device according to an embodiment of the present invention.
Figure 2B:
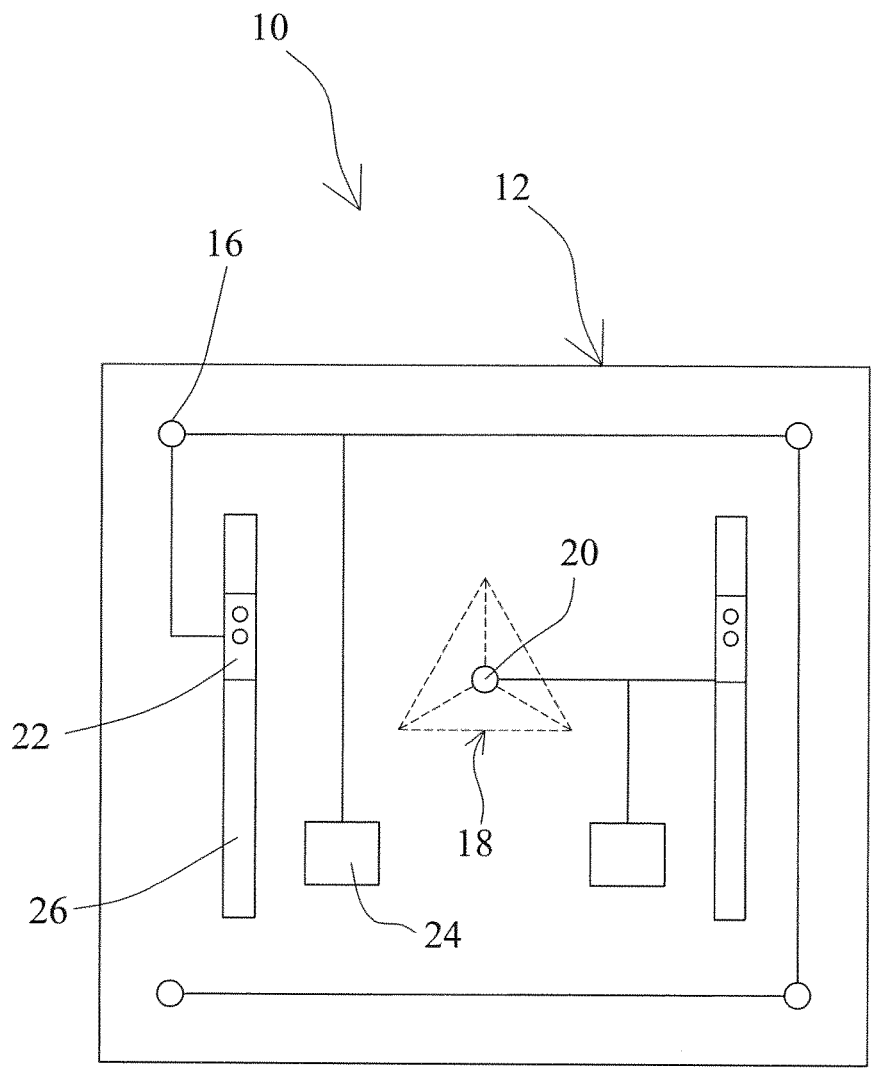
FIG. 2B is a rear view showing the calibration board device according to an embodiment of the present invention.
Figure 2C:
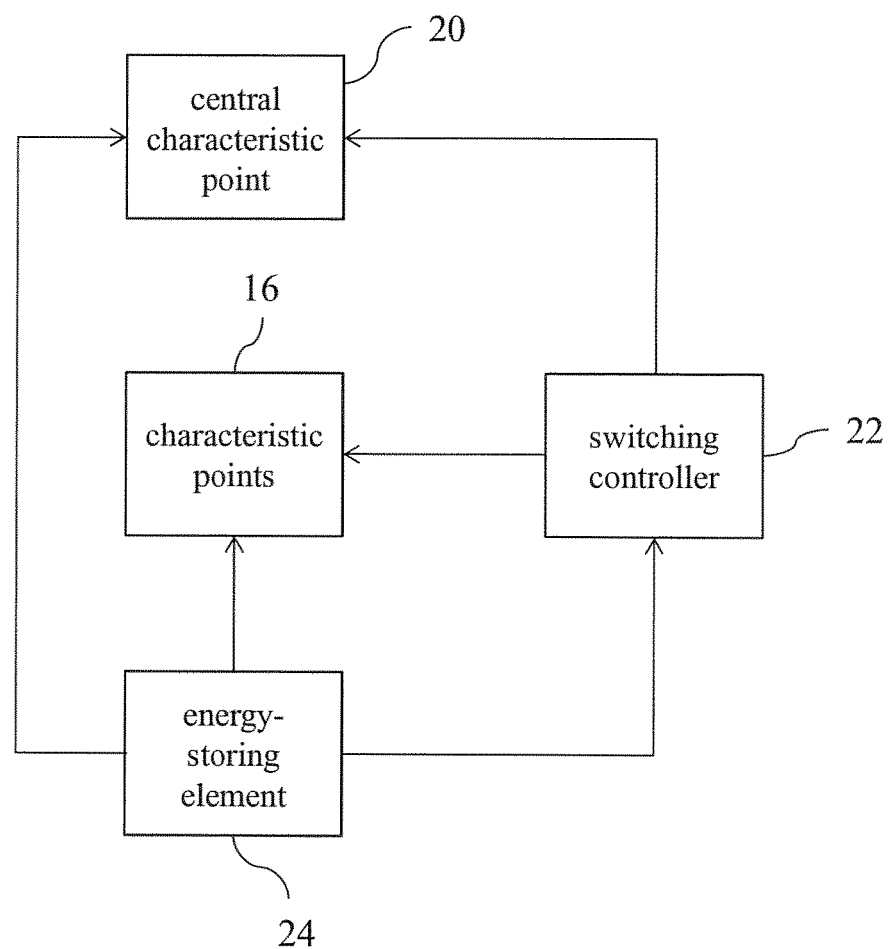
FIG. 2C is a block diagram schematically showing the calibration board device according to an embodiment of the present invention.

Refer to FIG. 1 and FIGS. 2A-2C. FIG. 1 shows a system using a method for merging system position. The system comprises a calibration board device 10, and a processor 30 is electrically connected with a camera 32 and a distance sensor 34. The calibration board device 10 is shown in FIG. 2A and FIG. 2B. The calibration board device 10 comprises a board 12 realized with a plastic board. The board 12 has an aimed pattern 14. In the embodiment, the aimed pattern 14 is exemplified by a chessboard pattern with white squares and black squares arranged in an alternative way. The aimed pattern 14 has a plurality of characteristic points 16, such as light emitting diodes (LEDs) that can emit light. Besides, the characteristic points 16 are realized in other ways, such as using paster with color thereof different from the color of the aimed pattern 14. In the embodiment, the characteristic points 16 are exemplified by LEDs. The characteristic points 16 are provided to the camera 32 for retrieving a plurality of calibration images. Then, instead of manually defining characteristic points, the characteristic points 16 are directly found by using the light generated by the characteristic points 16 in cooperation with a specific light source characteristic search algorithm. The characteristic points 16 are helpful in calculating an intrinsic parameter and an extrinsic parameter of the camera 32. A central reflection element 18 is arranged on a center of the aimed pattern 14 of the board 12 and has a reflection concave surface 181. The central reflection element 18 is made of triangular metal such as stainless steel. A center of the central reflection element 181 has a central characteristic point 20 formed by a LED. The colors of the light sources emitted by the above-mentioned LEDs are red, blue or green. The abovementioned LEDs can emit the light contrasting with external light to clearly show the characteristic points. As shown in FIG. 2B and FIG. 2C, a switching controller 22 is arranged on another surface of the board 12 relative to the aimed pattern 14. The switching controller 22 is electrically connected with LEDs as the characteristic points 16 and the central characteristic point 20, switches the characteristic points 16 and the central characteristic point 20 and changes the colors of the light sources emitted by the characteristic points 16 and the central characteristic point 20. As a result, the colors of the light sources emitted by the characteristic points 16 and the central characteristic point 20 can be changed according to an environment state. For example, in an environment with more infrared rays, the characteristic points 16 and the central characteristic point 20 emitting blue light are used so that the characteristic points 16 and the central characteristic point 20 can be highlighted and easily identified by the camera 32. An energy-storing element 24 is arranged on another surface of the board 12 relative to the aimed pattern 14. The energy-storing element 24 is electrically connected with the characteristic points 16, the central characteristic point 20 and the switching controller 22, and provides electric energy to the characteristic points 16, the central characteristic point 20 and the switching controller 22. Two handles 26 are arranged on another surface of the board 12 relative to the aimed pattern 14. A user can take the calibration board device 10 by the handles 26.

Refer to FIG. 1 and FIG. 2A. The camera 32 is used to capture the image of the aimed pattern 14 of the calibration board device 10 to generate a plurality of calibration images. The calibration images are provided to the processor 30 so that the processor 30 finds out the characteristic points 16 of the calibration board device 10. The processor 30 obtains the intrinsic parameter and the extrinsic parameter of the camera 32 from the relation between the calibration images and a real space. A distance sensor 34, such as a radar sensor or a laser sensor, emits a distance sensing signal to the reflection concave surface 181 of the central reflection element 18 to obtain the coordinates of the reflection concave surface 181 of the calibration board device 10 in the real space.

Figure 3:
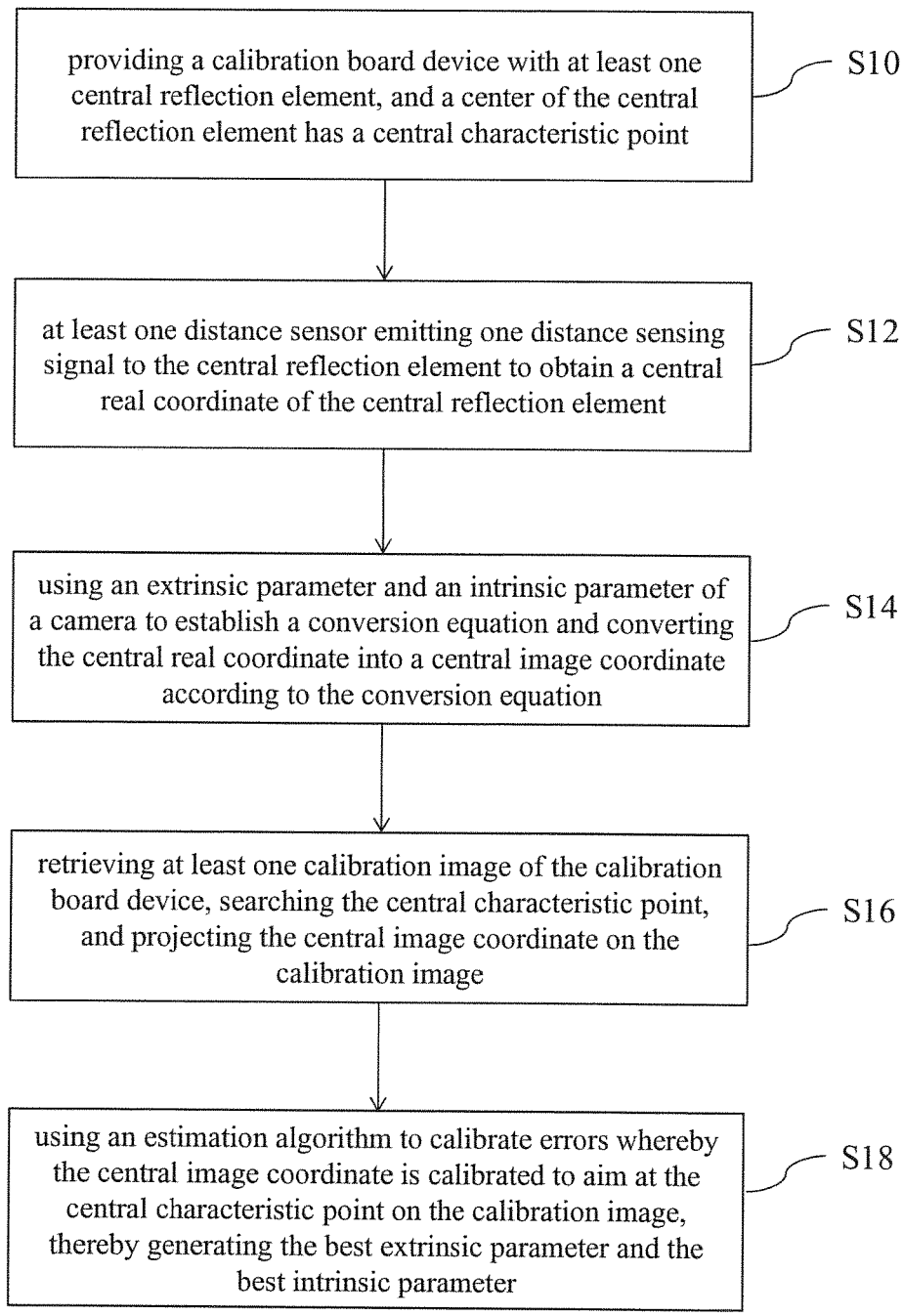
FIG. 3 is a flow chart showing a method for system position according to an embodiment of the present invention.

After introducing the system using the method for merging system position, the present invention introduces the method for merging system position. Refer to FIGS. 1-3. In the method for merging system position, Step S10 is firstly performed. In Step S10, a calibration board device 10 is provided. The structure of the calibration board device 10 has been introduced as abovementioned so will not be reiterated. Then, in Step S12, the distance sensor 34 emits at least one distance sensing signal to the reflection concave surface 181 of the central reflection element 18 of the calibration board device 10 to obtain the central real coordinate of the reflection concave surface 181. Then, in Step S14, the extrinsic parameter and the intrinsic parameter of the camera 32 are used to establish a transformation equation, thereby transforming the central real coordinate into a central image coordinate that can be projected on an image. The transformation equation (1) is expressed as following:

$$P_I = H_I \cdot H_E \cdot P_D \quad (1)$$

$P_I$ is the central image coordinate, $P_D$ is the central real coordinate, $H_I$ is the intrinsic parameter, and $H_E$ is the extrinsic parameter.

After the camera 32 retrieves a plurality of calibration images of the calibration board device 10, the calibration images are determined by Caltech camera calibration toolbox to generate the intrinsic parameter and the extrinsic parameter of the camera 32. Developed by California institute of technology, Caltech camera calibration toolbox finds out a plurality of characteristic points 16 of the calibration board device 10, and then searches the relation between the characteristic points 16 of the calibration board device 10 on the calibration image and a real space to obtain a horizontal focus scale coefficient, a vertical focus scale coefficient, center points of image coordinates, a rotation matrix, a translation matrix, and angle parameters of axes, thereby obtaining the intrinsic parameter and the extrinsic parameter of the camera 32.

The purpose of the intrinsic parameter is to transform the coordinates of the camera 32 into image coordinates. On the other hand, the intrinsic parameter is used to transform three-dimension coordinates of the camera model into two-dimension image space coordinates. The intrinsic parameter is obtained from an intrinsic parameter equation (2) expressed as following:

$$H_I = \begin{bmatrix} f_x & 0 & u_0 \\ 0 & f_y & v_0 \\ 0 & 0 & 1 \end{bmatrix} \quad (2)$$

$H_I$ is the intrinsic parameter, $f_x$ is the horizontal focus scale coefficient, $f_y$ is the vertical focus scale coefficient, $u_0$ and $v_0$ are the center points of the image coordinates.

The purpose of the extrinsic parameter is to transform three-dimension real coordinate system into three-dimension camera coordinate system. The extrinsic parameter of the present invention further comprises a relative position between the camera 32 and the distance sensor 34. The extrinsic parameter is expressed by the relative position between the camera 32 and the distance sensor 34. An extrinsic parameter equation (3) is shown as following:

$$H_E = [\,R_{3\times3}\ \ T_{3\times1}\,] = \begin{bmatrix} \gamma_1 & \gamma_2 & \gamma_3 & t_1 \\ \alpha_1 & \alpha_2 & \alpha_3 & t_2 \\ \beta_1 & \beta_2 & \beta_3 & t_3 \end{bmatrix} \quad (3)$$

$H_E$ is the extrinsic parameter, and R and T respectively denote the rotation matrix and the translation matrix, and $\gamma_i$, $\alpha_i$, $\beta_i$ are the angle parameters of the camera coordinate system relative to the x, y, z axes of the distance sensor coordinate system, and $t_i$ includes a relative horizontal distance, a relative vertical distance and a relative depth between the camera and the distance sensor.

As are result, when the distance sensor 34 obtains a real coordinate, the distance sensor 34 transforms the central real coordinate into the central image coordinate according to equation (1), and projects the central image coordinate on the image space, so as to know the real object position in the image space.

After Step S14, Step S16 is performed. In Step S16, the camera 32 is used to retrieve at least one calibration image of the calibration board device 10 to search the central characteristic point 20 of the calibration board device 10 on the calibration image. Besides, the central image coordinate is projected on the calibration image. During transformation, the central image coordinate may have errors due to parameter setting or other uncertain factors, so that the central image coordinate cannot be precisely projected on the central characteristic point 20 on the calibration image when the central image coordinate is projected on the calibration image. In order to precisely project the central image coordinate on the central characteristic point 20 on the calibration image, Step S18 is then performed. The embodiment uses an estimation algorithm to calibrate errors whereby the central image coordinate is calibrated to aim at the central characteristic point on the calibration image, thereby generating the calibrated extrinsic parameter and the calibrated intrinsic parameter. The embodiment exemplifies Monte Carlo algorithm to perform calibration. For example, the estimated intrinsic and extrinsic parameters have errors: $\epsilon_{16\times1}$. $p_1$ includes the intrinsic and extrinsic parameters of the camera firstly estimated, wherein $$p_1 = [f_{x_1}, f_{y_1}, u_{0_1}, v_{0_1}, \gamma_{1_1}, \gamma_{2_1}, \gamma_{3_1}, \alpha_{1_1}, \alpha_{2_1}, \alpha_{3_1}, \beta_{1_1}, \beta_{2_1}, \beta_{3_1}, t_{1_1}, t_{2_1}, t_{3_1}]^T$$

Suppose n pieces of images are presently retrieved in all. Using an automatically-retrieving characteristic method, it is known that the position $G_i = (x_i, y_i)$, $i=1, \ldots, n$ of the calibration board device 10 which the distance sensing signal of the distance sensor 34 aims at. In addition, the central real coordinate $P_{D_{i1}}$ of the central reflection concave 181 obtained by the distance sensor 34 has been known. The central image coordinate expressed by $P_{D_{ij}}$ is shown by $P_{I_{i1}} = (u_{i1}, v_{i1}) = H_{I_1} \cdot H_{E_1} \cdot P_{D_{i1}}$. As a result, the first total errors are shown by $E_1 = \|P_{I_{i1}} - G_i\| = \sum_{i=1}^{n} \sqrt{(x_i - u_{i1})^2 + (y_i - v_{i1})^2}$. Next, Monte Carlo algorithm is used to randomly choose parameters from the error range of the intrinsic parameter and the extrinsic parameter.

$$p_j = [f_{x_j}, f_{y_j}, u_{0_j}, v_{0_j}, \gamma_{1_j}, \gamma_{2_j}, \gamma_{3_j}, \alpha_{1_j}, \alpha_{2_j}, \alpha_{3_j}, \beta_{1_j}, \beta_{2_j}, \beta_{3_j}, t_{1_j}, t_{2_j}, t_{3_j}]^T, j=1, \ldots, m,$$

wherein $f_{x_j} \in (f_{x_1} - \epsilon_1, f_{x_1} + \epsilon_1)$, $f_{y_j} \in (f_{y_1} - \epsilon_2, f_{y_1} + \epsilon_2)$, $u_{0_j} \in (u_{0_1} - \epsilon_3, u_{0_1} + \epsilon_3)$, $v_{0_j} \in (v_{0_1} - \epsilon_4, v_{0_1} + \epsilon_4)$, $\gamma_{1_j} \in (\gamma_{1_1} - \epsilon_5, \gamma_{1_1} + \epsilon_5)$, $\gamma_{2_j} \in (\gamma_{2_1} - \epsilon_6, \gamma_{2_1} + \epsilon_6)$, $\gamma_{3_j} \in (\gamma_{3_1} - \epsilon_7, \gamma_{3_1} + \epsilon_7)$, $\alpha_{1_j} \in (\alpha_{1_1} - \epsilon_8, \alpha_{1_1} + \epsilon_7)$, $\alpha_{2_j} \in (\alpha_{2_1} - \epsilon_9, \alpha_{2_1} + \epsilon_9)$, $\alpha_{3_j} \in (\alpha_{3_1} - \epsilon_{10}, \alpha_{3_1} + \epsilon_{10})$, $\beta_{1_j} \in (\beta_{1_1} - \epsilon_{11}, \beta_{1_1} + \epsilon_{11})$, $\beta_{2_j} \in (\beta_{1_1} - \epsilon_{12}, \beta_{2_1} + \epsilon_{12})$, $\beta_{3_j} \in (\beta_{3_1} - \epsilon_{13}, \beta_{3_1} + \epsilon_{13})$, $t_{1_j} \in (t_{1_1} - \epsilon_{14}, t_{1_1} + \epsilon_{14})$, $t_{2_j} \in (t_{2_1} - \epsilon_{15}, t_{2_1} + \epsilon_{15})$, and $t_{3_j} \in (t_{3_1} - \epsilon_{16}, t_{3_1} + \epsilon_{16})$. After update, a new image projection coordinate is figured out and shown by $P_{I_{i1}} = (u_{i1}, v_{i1}) = H_{I_1} \cdot H_{E_1} \cdot P_{D_{i1}}$, thereby obtaining new errors $$E_j = \|P_{I_{ij}} - G_i\| = \sum_{i=1}^{n} \sqrt{(x_i - u_{ij})^2 + (y_i - v_{ij})^2}.$$

Finally, $j_{out} = \arg\min E_j$, and $P_{j_{out}}$ is obtained and includes calibrated intrinsic parameter and calibrated extrinsic parameter. Then, the calibrated intrinsic parameter and calibrated extrinsic parameter are inserted into the transformation equation (1) to update the original intrinsic parameter and original extrinsic parameter whereby the coordinate can be more precisely transformed.

Accordingly, using the abovementioned method, the distance sensed by the distance sensor 34 can precisely merge with the image. Thus, the distance and position of the obstruction are exactly determined whereby the present invention effectively applies to an autonomous braking assistant system and an autonomous driving car.

In conclusion, the present invention transforms and merges coordinates of different systems, displays the coordinates of obstructions sensed by the distance sensor on the image, and precisely estimates the positions of the obstructions on the image. Additionally, the present invention directly establishes several characteristic points on an aimed device lest the characteristic points be manually set on the image subsequently. As a result, the present invention improves the speed of calculation process and system credibility when calculating the parameters.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A calibration method for merging object coordinates for autonomous generation of calibration parameters in multi-sensor obstruction detection, comprising:
providing a calibration board device with a center thereof having at least one central reflection element, a center of said central reflection element having a central characteristic point;
actuating at least one distance sensor to emit at least one distance sensing signal to said central reflection element and obtain a central real coordinate of said central reflection element based on sensed reflection of the distance sensing signal therefrom in real space;
establishing a transformation equation based on an extrinsic parameter and an intrinsic parameter of a camera, and transforming said central real coordinate into a central image coordinate according to said transformation equation;
actuating said camera to retrieve at least one calibration image of said calibration board device disposed in real space at the central real coordinate, searching said central characteristic point on said calibration image, and projecting said central image coordinate on said calibration image; and
whereby said central image coordinate is calibrated to according to an error estimation algorithm to align with said central characteristic point on said calibration image, and said extrinsic parameter and said intrinsic parameter are thereby correspondingly adjusted.

2. The calibration method for merging object coordinates of claim 1, wherein said error estimation includes execution of a Monte Carlo algorithm to adjust said extrinsic parameter and said intrinsic parameter of said camera, thereby generating a calibrated extrinsic parameter and a calibrated intrinsic parameter.

3. The calibration method for merging object coordinates of claim 1, wherein said transformation equation is expressed as follows: $P_I = H_I \cdot H_E \cdot P_D$, where $P_I$ is said central image coordinate, $P_D$ is said central real coordinate, $H_I$ is said intrinsic parameter, and $H_E$ is said extrinsic parameter.

4. The calibration method for merging object coordinates of claim 3, wherein said extrinsic parameter and said intrinsic parameter of said camera are obtained by actuating said camera to retrieve a plurality of calibration images of said calibration board device and determining a representative relationship between a plurality of characteristic points of said calibration board device on said calibration images and real space.

5. The calibration method for merging object coordinates of claim 4, wherein said extrinsic parameter includes a relative position between said camera and said distance sensor.

6. The calibration method for merging object coordinates of claim 1, wherein said distance sensor is a radar sensor or a laser sensor.

7. The calibration method for merging object coordinates of claim 1, wherein said central reflection element has a reflection concave surface.

8. A calibration board apparatus for use in merging object coordinates for autonomous generation of calibration parameters in multi-sensor obstruction detection, comprising:
- a board graphically defining an aimed pattern, said aimed pattern having a plurality of characteristic points disposed thereon;
- a camera provided to retrieve a plurality of calibration images of the board;
- a processor coupled to said camera executing to calculate an intrinsic parameter and an extrinsic parameter of said camera; and
- a central reflection portion arranged at a center of said aimed pattern, said central reflection portion having a reflection concave surface, said central reflection portion having a central characteristic point disposed at a center thereof;

wherein said central reflection portion is configured to reflect a distance sensing signal emitted by a distance sensor for determining a central real coordinate of said central reflection portion in real space based thereon.

9. The calibration board apparatus of claim 8, wherein said characteristic points and said central characteristic point are formed by light emitting diodes (LEDs).

10. The calibration board apparatus of claim 9, further comprising:
- a switching control portion arranged on said board, electrically connected with said LEDs, switching said LEDs and changing colors of light sources emitted by said LEDs; and
- an energy-storing portion arranged on said board, electrically connected with said LEDs and said switching control portion, and providing electric energy to said LEDs and said switching control portion.

11. The calibration board apparatus of claim 10, wherein said colors of said light sources emitted by said LEDs are red, blue or green.

12. The calibration board apparatus of claim 8, wherein said central reflection portion is made of triangular metal.

13. The calibration board apparatus of claim 8, further comprising two handles arranged on another surface of said board relative to said aimed pattern.

* * * * *